(12) United States Patent
Knight et al.

(10) Patent No.: US 8,569,430 B2
(45) Date of Patent: Oct. 29, 2013

(54) METHOD OF SPRAY DRYING PHENOL-FORMALDEHYDE RESIN

(75) Inventors: James H. Knight, Conyers, GA (US); Paul S. Baxter, Conyers, GA (US); Robert M. Meacham, Pelahatchie, MS (US); John D. Cothran, Conyers, GA (US)

(73) Assignee: Georgia-Pacific Chemicals LLC, Atlanta, GA (US)

(*) Notice: Subject to any disclaimer, the term of this patent is extended or adjusted under 35 U.S.C. 154(b) by 250 days.

(21) Appl. No.: 12/963,679

(22) Filed: Dec. 9, 2010

(65) Prior Publication Data

US 2011/0136947 A1   Jun. 9, 2011

Related U.S. Application Data

(60) Provisional application No. 61/267,870, filed on Dec. 9, 2009.

(51) Int. Cl.
*C08L 61/00* (2006.01)

(52) U.S. Cl.
USPC ............................. 525/480; 34/372

(58) Field of Classification Search
USPC ........................... 34/372; 525/480
See application file for complete search history.

(56) References Cited

U.S. PATENT DOCUMENTS

| | | | |
|---|---|---|---|
| 4,098,770 A | 7/1978 | Berchem et al. | |
| 4,219,623 A | 8/1980 | Sudan et al. | |
| 4,336,842 A | 6/1982 | Graham et al. | |
| 4,424,300 A | 1/1984 | Udvardy et al. | |
| 4,657,767 A * | 4/1987 | Meade .......................... | 426/471 |
| 4,708,967 A | 11/1987 | Ferentchak et al. | |
| 4,945,000 A | 7/1990 | Widmann et al. | |
| 4,950,433 A | 8/1990 | Chiu | |
| 5,047,275 A * | 9/1991 | Chiu ............................. | 428/106 |
| 6,608,162 B1 | 8/2003 | Chiu et al. | |
| 7,343,818 B2 | 3/2008 | Gysling et al. | |
| 7,596,987 B2 | 10/2009 | Gysling et al. | |
| 2007/0265362 A1 | 11/2007 | Coppock | |

OTHER PUBLICATIONS

"Tergitol 15-S Series Surfactants Structure." Dow Performance Materials & Basic Chemistry Answers Center website. Updated on Jun. 1, 2010.*
"Tergitol TM 15-S-9 Surfactant." Technical Data Sheet. Downloaded on Nov. 16, 2012.*
Kosswig, K. "Surfactants," Ullmann's Encyclopedia of Industrial Chemistry, vol. 35, pp. 431-505, Published online Jun. 2000.*
International Search Report and Written Opinion of the International Searching Authority Mailed Sep. 23, 2011.

* cited by examiner

*Primary Examiner* — Liam Heincer
*Assistant Examiner* — Nicholas Hill
(74) *Attorney, Agent, or Firm* — Ram W. Sabnis

(57) ABSTRACT

Methods for producing spray-dried phenol-formaldehyde resole resins and products made therefrom. The method can include spray-drying an aerated liquid phenol-formaldehyde resole resin containing about 0.02 wt % or more of a surfactant, based on a combined weight of the liquid phenol-formaldehyde resole resin and the surfactant, to produce a spray-dried phenol-formaldehyde resole resin powder.

24 Claims, No Drawings

METHOD OF SPRAY DRYING PHENOL-FORMALDEHYDE RESIN

CROSS-REFERENCE TO RELATED APPLICATIONS

This application claims priority to U.S. Provisional Patent Application having Ser. No. 61/267,870, filed Dec. 9, 2009, which is incorporated by reference herein.

FIELD

Embodiments described herein generally relate to methods for spray-drying liquid phenol-formaldehyde resole resins and adjusting the packed bulk density of the spray-dried powder. More particularly, such embodiments relate to the use of surfactants, such as nonionic surfactants, for obtaining a desired packed bulk density in the spray dried phenol-formaldehyde resole resin powders.

BACKGROUND

Powdered, curable phenol-formaldehyde resins (resole resins) have found wide use as an adhesive for a variety of wood composites, particularly oriented strand board (OSB) and other similar wafer or chip board products. Phenol-formaldehyde resole resins are typically prepared by reacting a molar excess of formaldehyde with phenol under liquid, e.g., aqueous, alkaline reaction conditions. The resulting liquid phenol-formaldehyde resole resin is then spray-dried to produce the curable phenol-formaldehyde resin powder that is used as an adhesive. Methods for preparing curable phenol-formaldehyde resin powders by spray-drying are discussed and described in U.S. Pat. Nos. 4,098,770; 4,424,300; 4,708,967; 4,950,433; 4,945,000; and 6,608,162.

Adjusting or controlling the packed bulk density of the spray-dried powder within an appropriate range has been a common goal of spray-drying operations. Generally, a packed bulk density for the resole resin powder between about 0.2 g/cm$^3$ and about 0.8 g/cm$^3$ is suitable. Oftentimes, lower packed bulk density resin powders exhibit better mill performance in the manufacture of composite wood products as compared to higher packed bulk density powders. As such, it is often desirable to produce lower packed bulk density resin powders.

In the case of spray-drying phenol-formaldehyde resole resins, it is believed that the packed bulk density of the spray-dried resin is the result of a complex inter-play, inter alia, air feed rate and temperature, liquid feed rate and temperature, and/or liquid droplet size and the solids concentration of the feed liquid. Typically, the amount by which the phenol-formaldehyde resole resin is diluted with water and/or other liquid (s) before spray-drying is used to adjust the packed bulk density of the spray-dried resin powder. Provided that the powder is thoroughly dried, a higher level of dilution usually results in a lower packed bulk density for the recovered spray-dried powder. Increasing dilution of the phenol-formaldehyde resole resin, however, increases drying energy consumption and decreases powder output.

There is a need, therefore, for improved methods for adjusting, controlling, or otherwise influencing the packed bulk density of spray-dried phenol-formaldehyde resole resin powders.

SUMMARY

Methods for making and using spray-dried phenol-formaldehyde resole resins and products made therefrom are provided. In at least one specific embodiment, the method for producing a phenol-formaldehyde resole resin powder can include spray-drying an aerated liquid phenol-formaldehyde resole resin containing about 0.02 wt % or more of a surfactant, based on a combined weight of the liquid phenol-formaldehyde resole resin and the surfactant, to produce a spray-dried phenol-formaldehyde resole resin powder.

In at least one other specific embodiment, the method for producing a phenol-formaldehyde resole resin powder can include synthesizing a liquid phenol-formaldehyde resole resin. A surfactant can be combined with the liquid phenol-formaldehyde resole resin in an amount sufficient to produce a mixture containing about 0.02 wt % or more of the surfactant, based on a combined weight of the liquid phenol-formaldehyde resole resin and the surfactant. The mixture can be agitated to produce an aerated mixture. The aerated mixture can be spray-dried to produce a spray-dried phenol-formaldehyde resole resin powder.

In at least one other specific embodiment, the method for producing a phenol-formaldehyde resole resin powder can include spray-drying an aerated aqueous phenol-formaldehyde resole resin containing from about 0.02 wt % to about 2 wt % a surfactant, based on a combined weight of the aqueous phenol-formaldehyde resole resin and the surfactant to produce a spray-dried phenol-formaldehyde resole resin powder. The liquid phenol-formaldehyde resole resin can have a formaldehyde to phenol molar ratio ranging from about 2:1 to about 2.65:1 and a weight average molecular weight of about 1,000 daltons to about 8,000 daltons. The surfactant can be nonionic. The spray-dried resin can have a packed bulk density ranging from about 0.15 g/cm$^3$ to about 0.85 g/cm$^3$. The presence of the surfactant can reduce the packed bulk density of the spray-dried resin by at least 2%, as compared to an identical liquid phenol-formaldehyde resin spray-dried without the surfactant.

DETAILED DESCRIPTION

It has been surprisingly and unexpectedly discovered that the packed bulk density of a spray-dried phenol-formaldehyde resole resin can be reduced by spray drying a liquid, e.g., aqueous, phenol-formaldehyde resole resin with one or more surfactants. For example, the presence of one or more surfactants can reduce the packed bulk density of the spray-dried phenol-formaldehyde resole resin in an amount ranging from about 0.5% to about 30%, as compared to the same phenol-formaldehyde resole resin without the surfactant. In another example the presence of the one or more surfactants can reduce the packed bulk density of the spray-dried phenol-formaldehyde resole resin in an amount ranging from a low of about 1%, about 2%, about 3%, about 4%, or about 5% to a high of about 13%, about 17%, about 21%, about 23%, or about 25%, as compared to the same phenol-formaldehyde resole resin without the surfactant. In another example the presence of the one or more surfactants can reduce the packed bulk density of the spray-dried phenol-formaldehyde resole resin in an amount of from about 2% to about 15%, about 5% to about 12%, about 10% to about 25%, about 7% to about 23%, about 1% to about 20%, about 4.5% to about 15%, or about 11% to about 22%. In another example, the presence of the surfactant(s) in the liquid phenol-formaldehyde resole resin can reduce the packed bulk density of the spray-dried phenol-formaldehyde resole resin by at least 1%, at least 2%, at least 3%, at least 5%, at least 7%, or at least 10% as compared to the same phenol-formaldehyde resole resin without the surfactant.

Not wishing to be bound by theory, it is believed that the one or more surfactants enhance the entrainment or retention of air (or other gas) in the liquid phenol-formaldehyde resole resin when spray dried. In other words, the surfactant(s) is believed to increase the amount of air (or other gas) present during spray drying. It is further believed that the increased presence of the entrained air (or other gas) promotes the production of a spray dried resin powder having a reduced or lower packed bulk density for a given solids content in the liquid phenol-formaldehyde resin, e.g., at a particular level of resin dilution, than would otherwise be produced in the same liquid phenol-formaldehyde resole resin in the absence of the surfactant because the atomizer tends to produce a range of droplet sizes depending on the dilution, and these droplets dry to produce the particles of powder. In other words, it is believed that the surfactant causes air (or other gas) to be entrained in the droplets, which reduces the weight of the resin in the droplets, and therefore reduces the weight of the particles without significantly changing the volume of the particles.

The surfactant can be or include one or more ionic surfactants, nonionic surfactants, or a combination thereof. Nonionic surfactants can be or include one or more adducts of an alcohol, a phenol, a mercaptan, or a carboxylic acid with alkylene oxide, e.g., ethylene oxide. Suitable nonionic surfactants can include, but are not limited to, polyoxyalkylene surfactants, alkyl polyglucosides, fatty alcohols, and silicone-based surfactants (e.g., organosilicones). Illustrative polyoxyalkylene surfactants can include, but are not limited to, alkylphenol (e.g., nonylphenol) ethoxylates, propoxylates, and butoxylates, aliphatic alcohol ethoxylates, propoxylates, and butoxylates, and sorbitan fatty acid ester ethoxylates. Suitable commercially available polyoxyalkylene surfactants can include, but are not limited to, TERGITOL™, TRITION™, DOWFAX®, SOFTANOL®, and TWEEN® surfactants. Specific examples of polyoxyalkylene surfactants that can be purchased commercially include, but are not limited to, TRITON® X-114 and TERGITOL™ NP-9.

Alkylphenol ethoxylates, including nonylphenol ethoxylates have been found to perform desirably as nonionic surfactants. As such, alternatives or replacements to alkylphenol ethoxylates that exhibit equivalent performance have been developed and can also be commercially purchased. As used herein, the term "nonylphenol ethoxylate equivalent" refers to nonionic surfactants that perform equivalently to one or more alkylphenol ethoxylate surfactants, such as nonylphenol ethoxylate. For example, the Burlington Chemical Company has introduced a proprietary line of nonionic surfactants as potential replacements for nonylphenol ethoxylates, i.e., as nonylphenol ethoxylate equivalents, under the BURCO® label, one being BURCO® APR-95. An extensive description of nonionic surfactants also can be found in U.S. Pat. No. 3,578,589.

Ionic surfactants can be anionic, cationic, or amphoteric (zwitterionic). Anionic surfactants can be based on sulfate, sulfonate or carboxylate anions. Illustrative anionic surfactants can include, but are not limited to, sodium dodecyl sulfate, sodium lauryl ether sulfate, alkyl benzene sulfonate, and fatty acid salts (soaps). Cationic surfactants can be based on quaternary ammonium cations. Illustrative cationic surfactants can include, but are not limited to, alkyltrimethylammonium salts, polyethoxylated tallow amine, and benzalkonium chloride. Illustrative amphoteric surfactants can include, but are not limited to, dodecylbetaine and coco ampho glycinate.

The surfactant can have a Hydrophilic-Lipophilic Balance (HLB) anywhere from about 7 to about 15. For example, the surfactant can have a HLB ranging from a low of about 7, about 9, or about 11 to a high of about 13, about 14, or about 15. In another example, the surfactant can have a HLB ranging from a low of about 12, about 12.3, about 12.5, or about 12.7 to a high of about 13.3, about 13.5, about 13.7, or about 14. In another example, the surfactant can have a HLB of about 11.5 to about 14.5, about 12 to about 14, about 12 to about 13.5, about 12.5 to about 14, or about 12.5 to about 13.5.

The amount of surfactant added to the liquid phenol-formaldehyde resole resin can be sufficient to produce a liquid phenol-formaldehyde resole resin containing about 0.02 percent by weight (wt %) or more of the surfactant, based on a combined weight of the liquid phenol-formaldehyde resole resin and the surfactant. For example, the amount of the surfactant in the aqueous phenol-formaldehyde resole resin can be about 0.05 wt % or more, about 0.1 wt % or more, about 0.3 wt % or more, about 0.5 wt % or more, about 0.7 wt % or more, about 1 wt % or more, about 1.1 wt % or more, about 1.3 wt % or more, about 1.5 wt % or more, about 1.7 wt % or more, about 1.9 wt % or more, about 2 wt % or more about 2.1 wt % or more, or about 2.3 wt % or more, based on the combined weight of the liquid phenol-formaldehyde resole resin and the surfactant. In another example, the amount of the surfactant in the aqueous phenol-formaldehyde resole resin can range from a low of about 0.02 wt %, about 0.05 wt %, or about 0.07 wt %, or about 0.1 wt % to a high of about 1 wt %, about 1.5 wt %, about 2 wt %, or about 2.5 wt %, based on the combined weight of the liquid phenol-formaldehyde resole resin and the surfactant. In another example, the amount of the surfactant in the aqueous phenol-formaldehyde resole resin can range from a low of about 0.05 wt %, about 0.08 wt %, or about 0.1 wt % to a high of about 0.2 wt %, about 0.4 wt %, about 0.6 wt %, about 0.8 wt %, or about 1 wt %, based on the combined weight of the liquid phenol-formaldehyde resole resin and the surfactant. In another example, the amount of the surfactant in the aqueous phenol-formaldehyde resole resin can range from about 0.02 wt % to about 1 wt %, about 0.02 wt % to about 0.7 wt %, about 0.02 wt % to about 0.5 wt %, about 0.02 wt % to about 0.3 wt %, about 0.02 wt % to about 0.2 wt %, or about 0.02 wt % to about 0.1 wt %, based on the combined weight of the liquid phenol-formaldehyde resole resin and the surfactant. In another example, the amount of the surfactant in the aqueous phenol-formaldehyde resole resin can range from about 0.05 wt % to about 1 wt %, about 0.05 wt % to about 0.7 wt %, about 0.05 wt % to about 0.5 wt %, about 0.05 wt % to about 0.3 wt %, about 0.05 wt % to about 0.2 wt %, or about 0.05 wt % to about 0.15 wt %, based on the combined weight of the liquid phenol-formaldehyde resole resin and the surfactant. In another example, the amount of the surfactant in the aqueous phenol-formaldehyde resole resin can range from about 0.02 wt % to about 0.2 wt %, about 0.2 wt % to about 0.5 wt %, about 0.5 wt % to about 1 wt %, about 1 wt % to about 1.5 wt %, or about 1.5 wt % to about 2 wt %.

The phenol-formaldehyde resole resin can be a phenol-formaldehyde resin prepared under liquid, e.g., aqueous, alkaline reaction conditions using a molar excess of formaldehyde. For example, a suitable phenol-formaldehyde resin can be prepared at a final formaldehyde to phenol molar ratio (F:P) in the range of abut 2:1 to about 2.65:1, about 2.1:1 to about 2.65:1, or about 2.25:1 to 2.65:1. Phenol-formaldehyde resins prepared within such a molar ratio range typically have a weight average molecular weight in a range of about 1,000 daltons to about 8,000 daltons. Such resin compositions are commonly referred to as "resole resins." A particularly suitable aqueous phenol-formaldehyde resole resin composition can be made at a formaldehyde:phenol (F:P) molar ratio of about 2.4:1 to about 2.5:1, e.g., an F:P molar ratio of 2.45:1. As used herein, the term "formaldehyde to phenol molar ratio" and "F:P molar ratio" are used interchangeably and refer to the total amount, in moles, of the formaldehyde compounds that will be combined with each mole of the phenol compounds and assumes no loss of the formaldehyde or phenol compounds through volatilization, hydrolysis, or other means. For example, 124.14 grams of a phenol-formaldehyde resin produced by reacting 30.03 grams formaldehyde and 94.11 grams phenol would be referred to as having a formaldehyde to phenol (F:P) molar ratio of 1:1. Similarly, a 124.14 gram mixture of phenol and formaldehyde having a formaldehyde to phenol molar ratio of 1:1 would also contain 30.03 grams formaldehyde and 94.11 grams phenol.

A suitable aqueous phenol-formaldehyde resole resin composition can be produced by reacting phenol and formaldehyde in water under an alkaline condition so as to yield a phenol-formaldehyde resole resin having a weight average molecular weight of about 1,000 to about 8,000 daltons. For example, the weight average molecular weight of the phenol-formaldehyde resole resin can range from a low of about 1,000 daltons, about 2,500 daltons, or about 3,000 daltons to a high of about 5,000 daltons, about 6,000 daltons, about 7,000 daltons. In another example, the weight average molecular weight of the phenol-formaldehyde resole resin can be between about 1,500 daltons and about 5,000 daltons, about 1,800 daltons to 4,500 daltons, or about 2,000 daltons to about 4,000 daltons.

The weight average molecular weight of the phenol-formaldehyde resole resin can be determined by gel permeation chromatography (GPC). The GPC method can use tetrahydrofuran as a solvent/diluent and a system of two mixed C chromatographic columns preceding a 500 Angstroms PLgel column, all available from Polymer Laboratories (now part of Varian, Inc.). The column arrangement is calibrated using a range of polystyrene standards. For determining the weight average molecular weight of a particular resin sample, the sample is injected along with polystyrene, such as having a molecular weight of about 250,000 daltons, and toluene as an internal standard. A Model 759A Absorbance Detector from Applied Biosystems is used to monitor the column output and assist the molecular weight determination. The method of determining the molecular weight of a phenol-formaldehyde resin is well understood by those skilled in the art.

Any known method capable of producing a liquid phenol-formaldehyde resole resin can be used. Suitable methods for synthesizing a liquid phenol-formaldehyde resole resin composition can include both single step processes and multi-step or "programmed" processes (i.e., staged monomer/catalyst addition). While batch operations are the standard, continuous processes are also possible. Standard conditions, procedures and reactants for making an aqueous resole resin, well-known to those skilled in the art, can be used.

In one or more embodiments, the phenol-formaldehyde resole resin can be produced by adding to a reactor containing phenol, an amount of formaldehyde sufficient to establish an initial formaldehyde to phenol molar ratio (F:P) in the range of about 0.6:1 to about 1.6:1. The formaldehyde can then be reacted, under an alkaline reaction condition, with the phenol to produce the phenol-formaldehyde resole resin. Following the initial reaction, an additional amount of formaldehyde can be added to the reaction mixture, sufficient to establish a cumulative phenol to formaldehyde mole ratio (F:P) in the range of about 2:1 to about 2.65:1. In another example, the phenol-formaldehyde resole resin can be produced by adding to a reactor containing formaldehyde, an amount of phenol sufficient to establish an initial formaldehyde to phenol molar ratio (F:P) in the range of about 0.6:1 to about 1.6:1. The formaldehyde can then be reacted, under an alkaline reaction condition, with the phenol to produce the phenol-formaldehyde resole resin. Following the initial reaction, an additional amount of formaldehyde can be added to the reaction mixture, sufficient to establish a cumulative phenol to formaldehyde mole ratio (F:P) in the range of 2:1 to 2.65:1.

The reaction can be carried out in a liquid medium. Illustrative liquid mediums can include, but are not limited to, water, methanol, acetonitrile, or any combination thereof. As such, the liquid phenol-formaldehyde resole resin can be mixture of the phenol-formaldehyde resole resin and at least one of water, methanol, acetonitrile, or any combination thereof.

Prior to any dilution before spray-drying, the aqueous phenol-formaldehyde resole resin composition can have a resin solids content of about 30 wt % to about 65 wt % solids, 30 wt % to about 50 wt % solids, or about 30 wt % to about 45 wt % solids. As used herein, the solids content of the phenol-formaldehyde resole resin when combined with a liquid medium, as understood by those skilled in the art, can be measured by determining the weight loss upon heating a small sample, e.g., 1-5 grams, of the liquid phenol-formaldehyde resole resin to a suitable temperature, e.g., 105° C., and for a length of time sufficient to remove the liquid. By measuring the weight of the sample before and after heating, the percent solids in the sample can be directly calculated or otherwise estimated.

Conveniently, a batch process can be used to synthesize a suitable liquid phenol-formaldehyde resole resin composition by a single-stage alkaline condensation of phenol and formaldehyde under vacuum reflux at a temperature between about 50° C. to about 100° C., preferably above about 70° C., and more preferably above about 80° C.

The phenol-formaldehyde resole resin can be modified by the post addition of caustic and/or other additives such as urea and/or ammonia, which often are added to reduce the residual level of free, unreacted formaldehyde in the synthesized resin. Other additives can include, but are not limited to, dispersants, biocides, viscosity modifiers, pH adjusters, coupling agents, lubricants, defoamers, and the like.

When preparing a liquid phenol-formaldehyde resole resin composition, an alkaline catalyst can be used to promote the reaction of formaldehyde with phenol. The catalyst can be one of the inorganic or organic alkaline catalysts known to be useful in preparing phenol-formaldehyde resole resins. Illustrative alkaline catalysts can include, but are not limited to, alkali metal hydroxides, alkali metal carbonates, alkaline earth oxides, or any combination thereof. Illustrative alkali metal hydroxides can include, but are not limited to, sodium hydroxide, lithium hydroxide, potassium hydroxide, or any combination thereof. Generally sodium hydroxide is used based on its cost, availability, and suitability. Illustrative alkali metal carbonates can include, but are not limited to, sodium carbonate, lithium carbonate, potassium carbonate, or a combination thereof. Illustrative alkaline earth metal hydroxides can include, but are not limited to, magnesium hydroxide, calcium hydroxide, barium hydroxide, organic amines, or any combination thereof. Illustrative alkaline earth oxides can include, but are not limited to, calcium oxide, strontium oxide, barium oxide, or any combination thereof. In one or more embodiments, the catalyst can be used in a low amount, but in an effective amount to catalyze the reaction.

The liquid phenol-formaldehyde resole resin can also be prepared using staged addition processes, which are well known to those skilled in the art. When preparing the liquid phenol-formaldehyde resole resin in this way, formaldehyde can be added gradually to the phenol, and/or phenol can be added gradually to the formaldehyde and/or the alkaline catalyst can be added gradually to a mixture of formaldehyde and phenol to promote a controlled polymerization.

In any of these synthesis processes (and in the preparation of the solid phenolformaldehyde component), the phenol-formaldehyde resole resin can be prepared using reactants that are commercially available in many forms such as solid, liquid, and/or gas. Formaldehyde is available as paraformaldehyde (a solid, polymerized formaldehyde) and more conveniently as formalin solutions (aqueous solutions of formaldehyde, sometimes with methanol, usually in 37%, 44%, or 50% formaldehyde concentrations). Formaldehyde also may be available as a gas. In at least one specific embodiment, the formaldehyde can be partially or completely replaced with one or more other aldehyde compounds. Other aldehyde compounds can include, but are not limited to, acetaldehyde, propionaldehyde, butyraldehyde, furfuraldehyde, benzaldehyde, or any combination thereof. One or more other aldehyde compounds, such as glyoxal can also be used in place of or in combination with formaldehyde and/or other aldehyde compounds. In at least one embodiment, a formalin solution low in methanol can be used as the formaldehyde source.

Phenol used for making the aqueous phenol-formaldehyde resole resins can be replaced, partially or completely, with other phenolic compounds un-substituted at either the two ortho positions or at one ortho and the para position. These unsubstituted positions can facilitate the desired polymerization reaction(s). Any one, all, or none of the remaining carbon atoms of the phenol ring can be substituted in a conventional fashion. The nature of the substituents can vary widely, and it is only necessary that the substituent not interfere in the polymerization of the aldehyde with the phenol at the ortho and/or para positions. Substituted phenols which optionally can be employed in the formation of the liquid phenol-formaldehyde resole resin can include, but are not limited to, alkyl substituted phenols, aryl substituted phenols, cycloalkyl substituted phenols, alkenyl substituted phenols, alkoxy substituted phenols, aryloxy substituted phenols, and halogen substituted phenols, the foregoing substituents possibly containing from 1 to about 26, from 1 to about 20, from 1 to about 15, or from 1 to about 9 carbon atoms.

Specific examples of suitable phenolic compounds for replacing a portion or all of the phenol used in preparing the phenol-formaldehyde resin compositions can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof.

The liquid phenol-formaldehyde resole resin composition can have an alkalinity, i.e., contains a base, in the range of about 0.5% to about 15%, about 1% to about 12%, or about 2% to 8%, e.g., about 6%, based on the weight of the liquid resole resin composition, when the base is sodium hydroxide. If a different base is used, the alkalinity content can be proportioned to be equivalent on a molar weight basis to the above noted range based on sodium hydroxide. For example, to attain the equivalent of an alkalinity of 6% sodium hydroxide, i.e., 6 grams of sodium hydroxide in 100 grams of liquid resin, about 8.4 grams of potassium hydroxide in 100 grams of the resin solution would be required. As noted above, the base conveniently may be an alkali metal or alkaline earth metal compound such as a hydroxide, a carbonate, or an oxide.

Methods for spray-drying an aqueous resole resin are well known to those skilled in the art of preparing powdered adhesives for wood composite binders and a detailed description of the spray-drying equipment and spray-drying process variables are unnecessary. Spray drying refers to the process of atomizing (in the form of small droplets) the liquid resole resin into a gas stream (often a heated air stream) under controlled temperature conditions and under specific gas/liquid contacting conditions to effect evaporation of water (and/or other liquid(s)) from the atomized droplets and production of a dry particulate solid product.

In the spray-drying process, a liquid phenol-formaldehyde resole resin, as-synthesized or after further dilution, can be atomized to small droplets and mixed with hot air (e.g., air at an inlet temperature usually between about 140° C. to about 250° C.) to evaporate the liquid from the resin droplets. The temperature of the resin during spray-drying can be close to the boiling temperature of the liquid or higher. An outlet gas temperature of between about 60° C. to about 120° C. is common. Due to the curable (thermosetting) character of the resole resin, adjusting the operation of the spray-drying process to achieve thorough evaporation of the moisture at the lowest possible inlet and outlet temperatures is generally desired.

Spray drying is typically carried out with pressure nozzles (nozzle atomization—including two fluid nozzles) or centrifugal or rotary atomizers operating at high speeds (e.g., a spinning disc). Despite the high velocity generation of droplets, a spray dryer is designed so that the droplets avoid a much as possible contact with the spray dryer wall under proper operating procedures. This effect is achieved by a precise balance of atomizer velocity, air flow, spray dryer dimensions, e.g., height and diameter, and the design of the inlet and outlet means to produce a cyclonic flow of gas, e.g., air in the chamber. A pulse atomizer can also be used to produce the small droplets needed to facilitate evaporation of the liquid. In some cases, it can be desirable to include a flow promoter, such as calcium stearate and/or an aluminosilicate material, in the aqueous dispersion that is processed in a spray dryer simply to facilitate subsequent handling and transport of the spray dried powder (e.g., to avoid clumping).

The particle size and moisture content of the spray dried powder (and accordingly the packed bulk density of the powder) is a complex function, inter alia, of the air feed rate and temperature, liquid feed rate and temperature, liquid droplet size and the solids concentration of the feed liquid. The particle size distribution and moisture (or liquid) content of the spray dried resin can be controlled by operations well known in the spray drying art by controlling variables such as feed resin solids content of the liquid mixture, surface tension, speed of the rotary atomizer, feed rate of the aqueous resin, and the temperature differences between the inlet and outlet (atomization gas temperature). The spray-dried resin can have a moisture content of less than about 10 wt %, less than about 8 wt %, less than about 6 wt %, less than about 4 wt %, less than about 3 wt %, less than about 2 wt %, or less than about 1 wt %. For example, the moisture (or liquid) content of the spray-dried powder can be less than 6 wt %.

Particle size distribution can be an important factor in production of a powdered resin. The powdered resin can have a particle size ranging from about 0.1 µm to about 100 µm. For example, the particle size of the powdered resin can range from a low of about 1 µm, about 5 µm, about 10 µm, or about 20 µm to a high of about 45 µm, about 60 µm, about 70 µm, or about 80 μm. In another example, about 80 wt % to about 90 wt % of the powdered resin can have a particle size of less than about 100 μm, less than about 85 μm, or less than about 75 μm. In another example, about 60 wt % to about 70 wt % of the powdered resin can have a particle size of less than about 60 μm, less than about 50 μm, or less than about 45 μm.

The powdered resin can have a packed bulk density ranging from about 0.15 g/cm$^3$ to about 0.85 g/cm$^3$. For example, the packed bulk density of the powdered resin can range from a low of about 0.15 g/cm$^3$, about 0.3 g/cm$^3$, about 0.35 g/cm$^3$, about 0.4 g/cm$^3$, or about 0.45 g/cm$^3$ to a high of about 0.6 g/cm$^3$, about 0.65 g/cm$^3$, about 0.7 g/cm$^3$, about 0.75 g/cm$^3$, about 0.8 g/cm$^3$, or about 0.85 g/cm$^3$. In another example, the powdered resin can have a packed bulk density of about 0.45 g/cm$^3$ to about 0.57 g/cm$^3$, about 0.4 g/cm$^3$ to about 0.6 g/cm$^3$, about 0.55 g/cm$^3$ to about 0.75 g/cm$^3$, or about 0.35 g/cm$^3$ to about 0.65 g/cm$^3$. In another example, the powdered resin can have a packed bulk density of less than about 0.68 g/cm$^3$, less than about 0.6 g/cm$^3$, less than about 0.58 g/cm$^3$, or less than about 0.57 g/cm$^3$. As noted above, spray-drying the liquid phenol-formaldehyde resole resin combined with the surfactant can reduce the packed bulk density of the powdered resin as compared to the same liquid phenol-formaldehyde resole resin without the surfactant The surfactant, e.g., a nonionic surfactant, can be added with agitation into the liquid resole resin that can then be spray-dried. In addition to the surfactant dilution water or other liquid, and/or other additives can also be added. As noted above, the amount of surfactant added to the liquid phenol-formaldehyde resole resin can produce a liquid resole resin containing from about 0.02 wt % or more of the surfactant, based on the combined weight of the liquid phenol-formaldehyde resole resin and surfactant. Dilution water can be added as needed to adjust the solids content of the resole resin to about 30 wt % to about 65 wt % solids. In another example, the amount of dilution water (or other liquid) added can be sufficient to produce a liquid phenol-formaldehyde resole resin having a solids content ranging from a low of about 25 wt %, about 30 wt %, about 35 wt % or about 40 wt % to a high of about 50 wt %, about 55 wt %, about 60 wt %, or about 65 wt %.

The surfactant, e.g., a nonionic surfactant, can be added to the liquid phenol-formaldehyde resole resin with sufficient agitation to cause air to be entrained in the agitated liquid. The surfactant can be mixed, blended, or otherwise combined with the liquid phenol-formaldehyde resole resin by mechanical agitation, e.g., magnetic sir bar, impellers, blades, and the like. In another example, ultrasonic sound waves can be used to combine the mix, blend, or otherwise combine the liquid phenol-formaldehyde resole resin and surfactant. During mixing of the surfactant and liquid phenol-formaldehyde resole resin, air or other suitable gas or combination of gases can be injected into the mixture to further increase the amount of entreated or retained gas therein.

The aeration level of the liquid phenol-formaldehyde resole resin, also known as the gas volume fraction (GVF), created by the agitation of the resole resin in the presence of the surfactant can be selected such that the resole resin to be spray-dried has a GVF of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, or more than 20%, based on the liquid volume of the de-aerated liquid resole resin. In another example, the aerated liquid phenol-formaldehyde resole resin containing the surfactant can have a GVF ranging from a low of about 1%, about 2%, about 3%, about 4%, or about 5% to a high of about 7%, about 9%, about 11%, about 13%, about 15%, about 17%, or about 19%. In another example, the aerated liquid phenol-formaldehyde resole resin containing the surfactant can have a GVF of about 1% to about 20%, about 1% to about 10%, about 1.5% to about 15%, about 2% to about 12%, about 3% to about 9%, or about 2.5% to about 10%. In another example, the GVF of the agitated liquid phenol-formaldehyde resole resin containing the surfactant can be selected such that the liquid resole resin to be spray-dried has a GVF of no greater than about 100%, no greater than about 90%, no greater than about 80%, no greater than about 70%, no greater than about 60%, no greater than about 50%, no greater than about 45%, no greater than about 40%, no greater than about 35%, no greater than about 30%, no greater than about 25%, no greater than about 20%, no greater than about 15%, or no greater than about 10% based on the liquid volume of the de-aerated liquid resole resin. Those skilled in the art can select an appropriate technique for determining/monitoring the GVF of the aqueous resole to be spray-dried. For example, suitable techniques are discussed and described in U.S. Pat. Nos. 7,343,818 and 7,596,987. As recognized by one skilled in the art, the level of aeration of a liquid (GVF) also can be assessed by comparing the difference between the observed aerated density and the actual de-aerated density of the liquid.

As an alternative to producing a spray-dried resole of a lower packed bulk density at a given solids content in the liquid resole resin composition to be spray-dried, i.e., at a particular level of dilution, the addition of the surfactant, e.g., a nonionic surfactant can alternatively allow the preparation of a spray-dried resole powder of the same packed bulk density using a liquid resole resin composition of a higher solids content than one would have to use if spray-drying an aqueous resole resin in the absence of the surfactant. This method for preparing a spray-dried resole resin can lower the energy consumption of the spray-drying process (there being less liquid to evaporate) and increases the output of powdered resin as compared to operating in the absence of the surfactant, e.g., a nonionic surfactant. As a result, by adding a surfactant, e.g., a nonionic surfactant, with a suitable level of agitation into the liquid resole resin to be spray-dried, one is able to realize a significant operational advantage in producing curable phenol-formaldehyde resin powders by spray-drying.

The spray-dried material can be a free-flowing powder that is easily handled. Generally, at least 90 wt % of the powder passes through a 200 mesh screen (U.S. Standard Screen Series). In other words, at least 90 wt % of the particles can be smaller than 74 microns. Usually, at least about 70 wt % to about 90 wt % of the particles are greater than 10 microns. If necessary, the powder can be subjected to additional mechanical grinding.

Spray dried resin powder (resin particulates), prepared by spray drying the surfactant-modified, e.g., nonionic surfactant modified, liquid phenol-formaldehyde resole resin can be used in the preparation of wood composites made from wood (lignocellulosic) pieces (such as wood strands, wood wafers, wood chips, wood particles, wood flakes, and/or or wood fibers). Methods for using the powdered resole resin for making wood composites are well-known to those skilled in the art. Heat and pressure can be applied to a mat of wood pieces, e.g., wood wafers and/or oriented strands of wood, at least partially coated with the powdered resin in order to cure the resin and form a product. Conventional temperatures, time periods, pressures, and quantity of resin binder can be used.

As used herein, the terms "curing," "cured," and similar terms refer to the structural and/or morphological change that occurs in a the phenol-formaldehyde resole resin, such as by covalent chemical reaction (crosslinking), ionic interaction or clustering, improved adhesion to the substrate, phase transformation or inversion, and/or hydrogen bonding when the phenol-formaldehyde resole resin is heated to cause the properties of a rigid or semi-rigid substrate, such as a wood or other cellulose containing board or sheet, to which an effective amount of the phenol-formaldehyde resole resin has been applied, to be altered. In one or more embodiments, the method for producing a phenol-formaldehyde resole resin powder can include spray-drying an aerated liquid phenol-formaldehyde resole resin containing about 0.02 wt % to about 3 wt % of a surfactant, based on a weight of the liquid phenol-formaldehyde resole resin to produce a spray-dried resin. In one or more embodiments, the method for producing a phenol-formaldehyde resole resin powder can include synthesizing a liquid phenol-formaldehyde resole resin; combining a surfactant, e.g., a nonionic surfactant, with the liquid phenol-formaldehyde resole resin to produce a mixture; agitating the mixture to produce an aerated mixture; spray-drying the aerated mixture to produce a spray-dried resin. The aerated mixture can be spray dried before a gas volume fraction of the mixture falls below about 10%, below about 9%, below about 8%, below about 7%, below about 6%, below about 5%, below about 4%, below about 3%, below about 2%, below about 1%, below bout 0.5%, or below about 0.1%.

Wood composite products that can be made using such resin particulates include, but are not limited to, oriented strand board (OSB), oriented strand lumber (OSL), medium density fiberboard (MDF), high density fiberboard (HDF), PARALLAM®, plywood, hardboard, waferboard, chipboard, particleboard, flakeboard, and the like. The resin powder also can be re-constituted with water to form a liquid adhesive for making these and other wood composite products.

For cellulose based or cellulose containing products such as particle board, fiberboard, plywood, and oriented strand board, the amount of the phenol-formaldehyde resin applied to the cellulose material can range from a low of about 3 wt %, about 4 wt %, about 5 wt % or about 6 wt % to a high of about 10 wt %, about 12 wt %, about 15 wt %, or about 20 wt %, based on the combined weight of the cellulose material and the phenol-formaldehyde resole resin.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

In Example I, one comparative example (CEx. 1) and six inventive examples (Ex. 1-6) were evaluated in a laboratory to determine the effect surfactants had on reducing the packed bulk density of a spray-dried, powdered phenol-formaldehyde resole resin. The aqueous phenol-formaldehyde resole resin used for CEx. 1 and Ex. 1-6 was the liquid precursor used to prepare the commercially available powdered resin product sold by Georgia- Pacific Resins, Inc. under the name GP® 190C73 Woodweld®. A sufficient amount of surfactant was added to each of Examples 1-6 to provide a surfactant concentration ranging from about 0.1 wt % to about 0.3 wt %, and the concentration for each of Examples 1-6 are reported in Table 1 below. The surfactants used in each of Examples 1-6 were as follows: Ex. 1 and 2 used a commercially available effective nonylphenol ethoxylate equivalent surfactant (BURCO® APR-95) available from Burlington Chemical Co., LLC. Ex. 3-5 used a commercially available nonylphenol ethoxylate surfactant (TERGITOL™ NP-9) available from The Dow Chemical Company. Ex. 6 used a commercially available (1,1,3,3-Tetramethylbutyl)phenyl-polyethylene glycol surfactant (TRITON® X-114) also available from The Dow Chemical Company. The concentration of surfactant for each of Ex. 1-6 is shown in Table 1 below.

About 300 grams of the aqueous phenol-formaldehyde resole resin (CEx. 1) and the mixture of the aqueous phenol-formaldehyde resole resin and the surfactant (Ex. 1-6) were then spray-dried. Each example had a solids concentration of about 31 wt %. Each example was agitated using a high shear mixer that forms a deep vortex when mixing, thus allowing air to be whipped or blended into the mixture to produce the aerated mixture. The aerated mixture was mixed at room temperature for about for about 30 seconds, after which the aerated mixture was immediately introduced to a spray-drying apparatus. The spray drying apparatus was a Niro Mobile Minor™ spray dryer. The inlet temperature of the dryer was set at about 160° C. and the feed rate of the aerated mixtures were adjusted to yield an outlet temperature of about 80° C. to about 85° C. The atomizer speed was set at 5 on the spray dryer's scale of 0 to 10. The packed bulk density results were determined and are reported in Table 1 below.

TABLE 1

| Example | Amount Surfactant, wt % | Solids Content, wt % | PBD, lbs/ft$^3$ | % PBD Reduction |
| --- | --- | --- | --- | --- |
| CEx. 1 | 0.0 | 31 | 50.0 | 0.0 |
| Ex. 1 | 0.1 | 31 | 39.3 | 21.4 |
| Ex. 2 | 0.2 | 31 | 42.6 | 14.8 |
| Ex. 3 | 0.1 | 31 | 39.3 | 21.4 |
| Ex. 4 | 0.2 | 31 | 37.9 | 24.2 |
| Ex. 5 | 0.3 | 31 | 40.3 | 19.1 |
| Ex. 6 | 0.1 | 31 | 44.5 | 11.0 |

It was surprisingly and unexpectedly discovered that the presence of the surfactant in the aqueous phenol-formaldehyde resin substantially reduced the packed bulk density of the spray-dried, powdered phenol-formaldehyde resole resins. As shown in Table 1, the packed bulk density of CEx. 1 was about 50.0 lbs/ft3. The packed bulk densities for all inventive examples, however, were substantially reduced. The TRITON® X-114 surfactant combined with the aqueous phenol-formaldehyde resole resin in an amount of about 0.3 wt % (Ex. 6) reduced the packed bulk density of the spray-dried, powdered phenol-formaldehyde resole resin by about 11%. The BURCO® APR-95 surfactant combined with the aqueous phenol-formaldehyde resole resins in Examples 1 and 2 in an amount of about 0.1 wt % and about 0.2 wt %, respectively, reduced the packed bulk density of the spray-dried, powdered phenol-formaldehyde resole resins by about 21.4% and about 14.8%, respectively. The TERGITOL™ NP-9 surfactant combined with the aqueous phenol-formaldehyde resole resins in Examples 3-5 in an amount of about 0.1 wt %, about 0.2 wt %, and about 0.3 wt %, respectively, reduced the packed bulk density of the spray-dried, powdered phenol-formaldehyde resole resins by about 21.4%, about 24.2%, and about 19.1%, respectively.

Example II

In Example II, one comparative example (CEx. 2) and four inventive examples (Ex. 7-10) were evaluated on a commercial scale production process in a plant to determine the effect a surfactant had on reducing the packed bulk density of a spray-dried, powdered phenol-formaldehyde resole resin. The aqueous phenol-formaldehyde resole resin used for CEx. 2 and Ex. 7-10 was the liquid pre-cursor used to prepare the commercially available powdered resin product sold by Georgia-Pacific Resins, Inc. under the name GP® 145C48 Woodweld®. A sufficient amount of surfactant was added to each of Examples 7-10 to provide a surfactant concentration of about 0.1 wt % for all examples. The same surfactant was used for all examples (Ex. 7-10), which the same commercially available effective nonylphenol ethoxylate equivalent surfactant (BURCO® APR-95) available from Burlington Chemical Co., LLC, as used in Example I. For Examples 7-10, the surfactant and aqueous resin were mixed with both mechanical mixing and air sparging for about 2.5 hours to produce the aerated liquid phenol-formaldehyde resole resin. The aerated aqueous resins, at a temperature of about 65° C., were introduced to another (commercially sized) Niro spray dryer at a rate of about 169 lbs/min and spray-dried to produce the spray-dried powdered resin. The packed bulk density results were determined and are reported in Table 2 below.

TABLE 2

| Example | Amount Surfactant | Solids Content, wt % | PBD, lbs/ft$^3$ | % PBD Reduction |
|---|---|---|---|---|
| CEx. 2 | 0.0 | 40 | 42.0 | 0.0 |
| Ex. 7 | 0.1 | 40 | 39.0 | 7.1 |
| Ex. 8 | 0.1 | 40 | 37.4 | 11.0 |
| Ex. 9 | 0.1 | 40 | 37.3 | 11.2 |
| Ex. 10 | 0.1 | 40 | 36.1 | 14.0 |

Similar to the results in Example I, the presence of the surfactant in the aqueous phenol-formaldehyde resin was found to substantially reduce the packed bulk density of the spray-dried, powdered phenol-formaldehyde resole resins. As shown in Table 2, the packed bulk density of CEx. 1 was about 42.0 lbs/ft3, but packed bulk densities for all inventive examples were lower. It should be noted that it is not clear why the packed bulk density continued to reduce. Without wishing to be bound by theory it is believed that the reduction in the packed bulk density of the spray dried powder is attributable, at least in part, to less aqueous resin in the mixer, thus allowing more air to become whipped or otherwise entrained therein.

The packed bulk density of the powdered resins referred to herein were determined according to the following procedure. A 100 mL graduated cylinder (Vankel Model 10717 or an equivalent such as a Fisher NNI #3664-0100, cat #08-572-6D) was placed onto an analytical balance having an accuracy of +/−0.01 grams and the balance was tared. In a continuous steady flow, the powdered resin was poured into the graduated cylinder until there was approximately 100 mL of resin in the cylinder. The weight of the powdered resin poured into the graduated cylinder was recorded. The top of the graduated cylinder was then sealed and the graduated cylinder was then placed on a Vankel Tap Density Tester, Model 10700. The tap counter was set for 450 taps at 300 taps per minute. When taping was completed the volume of the powdered resin in the graduated cylinder was recorded. The packed bulk density was then determined according to the following equation:

$$PBD = (\text{powdered resin weight}/\text{resin volume}) \times 62.4$$

where PBD is the packed bulk density, the resin weight is in grams, the resin volume is in cubic centimeters, and 62.4 is the conversion factor for grams per cubic centimeter to pounds per cubic foot. Three samples of the powdered resin were analyzed for each example and the average value of the three samples was reported as the packed bulk density for the respective example.

Embodiments of the present disclosure further relate to any one or more of the following paragraphs:

1. A method for producing a phenol-formaldehyde resole resin powder, comprising: spray-drying an aerated liquid phenol-formaldehyde resole resin containing about 0.02 wt % or more of a surfactant, based on a combined weight of the liquid phenol-formaldehyde resole resin and the surfactant, to produce a spray-dried phenol-formaldehyde resole resin powder.

2. The method of paragraph 1, wherein the liquid phenol-formaldehyde resole resin has a total solids content ranging from about 30 wt % to about 65 wt %.

3. The method of paragraph 1 or 2, wherein the aerated liquid phenol-formaldehyde resole resin contains from about 0.02 wt % to about 2 wt % of the surfactant, based on the combined weight of the liquid phenol-formaldehyde resole resin and the surfactant.

4. The method according to any one of paragraphs 1 to 3, wherein the aerated liquid phenol-formaldehyde resole resin contains from about 0.05 wt % to about 0.3 wt % of the surfactant, based on the combined weight of the liquid phenol-formaldehyde resole resin and the surfactant.

5. The method according to any one of paragraphs 1 to 4, wherein the liquid phenol-formaldehyde resole resin is an aqueous phenol-formaldehyde resole resin.

6. The method according to any one of paragraphs 1 to 5, wherein the surfactant is nonionic.

7. The method according to any one of paragraphs 1 to 6, wherein the liquid phenol-formaldehyde resole resin has a formaldehyde to phenol molar ratio ranging from about 2:1 to about 2.65:1.

8. The method according to any one of paragraphs 1 to 7, wherein the liquid phenol-formaldehyde resole resin has a weight average molecular weight ranging from about 1,000 daltons to about 8,000 daltons.

9. The method according to any one of paragraphs 1 to 8, wherein the surfactant comprises a polyoxyalkylene surfactant; an alkyl polyglucoside surfactant; a fatty alcohol surfactant; a silicone-based surfactant; an adduct of an alkylene oxide and an alcohol, a phenol, a mercaptan, or a carboxylic acid; or any combination thereof.

10. The method according to any one of paragraphs 1 to 9, wherein the surfactant comprises nonylphenol ethoxylate, a nonylphenol ethoxylate equivalent, or a combination thereof.

11. The method according to any one of paragraphs 1 to 10, wherein the surfactant has a Hydrophilic-Lipophilic Balance of about 12 to about 14.

12. The method according to any one of paragraphs 1 to 11, wherein the spray-dried resin has a packed bulk density ranging from about 0.15 g/cm$^3$ to about 0.85 g/cm$^3$.

13. The method according to any one of paragraphs 1 to 12, wherein the presence of the surfactant reduces a packed bulk density of the spray-dried resin by about 2% or more, as compared to an identical aerated liquid phenol-formaldehyde resole resin spray-dried without the surfactant.

14. The method according to any one of paragraphs 1 to 13, wherein the aerated liquid phenol-formaldehyde resole resin has a gas volume fraction ranging from about 1% to about 20%.

15. The method according to any one of paragraphs 1 to 14, further comprising: combining the spray-dried resin with a plurality of particulates to form a curable mixture; and at least partially curing the curable mixture to produce a product.

16. The method of paragraph 16, wherein the particulates comprise a cellulose material.

17. A method for producing a phenol-formaldehyde resole resin powder, comprising: synthesizing a liquid phenol-formaldehyde resole resin; combining a surfactant with the liquid phenol-formaldehyde resole resin in an amount sufficient to produce a mixture containing about 0.02 wt % or more of the surfactant, based on a combined weight of the liquid phenol-formaldehyde resole resin and the surfactant; agitating the mixture to produce an aerated mixture; and spray-drying the aerated mixture to produce a spray-dried phenol-formaldehyde resole resin powder.

18. The method of paragraph 17, wherein the mixture contains from about 0.02 wt % to about 0.3 wt % of the surfactant, based on the combined weight of the liquid resole resin and the surfactant.

19. The method of paragraph 17 or 18, wherein the surfactant is nonionic and the mixture is sufficiently agitated to produce an aerated mixture having a gas volume fraction of about 1% to about 20%.

20. The method of paragraph 19, wherein the aerated mixture is spray-dried before the aeration caused by the agitation has dissipated such that the gas volume fraction decreases below about 1%.

21. The method according to any one of paragraphs 17 to 20, wherein the liquid phenol-formaldehyde resole resin has a weight average molecular weight of about 1,000 daltons to about 8,000 daltons and a formaldehyde to phenol molar ratio ranging from about 2:1 to 2.65:1.

22. The method according to any one of paragraphs 17 to 21, wherein the surfactant comprises a polyoxyalkylene surfactant; an alkyl polyglucoside surfactant; a fatty alcohol surfactant; a silicone-based surfactant; an adduct of an alkylene oxide and an alcohol, a phenol, a mercaptan, or a carboxylic acid; or any combination thereof.

23. The method according to any one of paragraphs 17 to 22, wherein the surfactant comprises a nonylphenol ethoxylate, a nonylphenol ethoxylate equivalent, or a combination thereof.

24. A method for producing a phenol-formaldehyde resole resin powder, comprising: spray-drying an aerated aqueous phenol-formaldehyde resole resin containing from about 0.02 wt % to about 2 wt % of a surfactant, based on a combined weight of the aqueous phenol-formaldehyde resole resin and the surfactant to produce a spray-dried phenol-formaldehyde resole resin powder, wherein: the liquid phenol-formaldehyde resole resin has a formaldehyde to phenol molar ratio ranging from about 2:1 to about 2.65:1 and a weight average molecular weight of about 1,000 daltons to about 8,000 daltons, the surfactant is nonionic, the aerated aqueous phenol-formaldehyde resole resin has a gas volume fraction of about 1% to about 20%, the spray-dried resin has a packed bulk density ranging from about 0.15 g/cm³ to about 0.85 g/cm³, and the presence of the surfactant reduces the packed bulk density of the spray-dried resin by at least 2%, as compared to an identical liquid phenol-formaldehyde resin spray-dried without the surfactant.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim 1s not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing a phenol-formaldehyde resole resin powder, comprising:
spray-drying an aerated liquid phenol-formaldehyde resole resin containing about 0.02 wt % to about 2.5 wt % of a surfactant, based on a combined weight of the liquid phenol-formaldehyde resole resin and the surfactant, to produce a spray-dried phenol-formaldehyde resole resin powder, wherein the surfactant is nonionic, and wherein the surfactant comprises an alkyl phenol ethoxylate, (1,1,3,3-tetramethylbutyl)phenyl-polyethylene glycol, or any mixture thereof.

2. The method of claim 1, wherein the liquid phenol-formaldehyde resole resin has a total solids content ranging from about 30 wt % to about 65 wt %.

3. The method of claim 1, wherein the aerated liquid phenol-formaldehyde resole resin contains from about 0.02 wt % to about 2 wt % of the surfactant, based on the combined weight of the liquid phenol-formaldehyde resole resin and the surfactant.

4. The method of claim 1, wherein the aerated liquid phenol-formaldehyde resole resin contains from about 0.05 wt % to about 0.3 wt % of the surfactant, based on the combined weight of the liquid phenol-formaldehyde resole resin and the surfactant.

5. The method of claim 1, wherein the liquid phenol-formaldehyde resole resin is an aqueous phenol-formaldehyde resole resin.

6. The method of claim 1, wherein the liquid phenol-formaldehyde resole resin has a formaldehyde to phenol molar ratio ranging from about 2:1 to about 2.65:1.

7. The method of claim 1, wherein the liquid phenol-formaldehyde resole resin has a weight average molecular weight ranging from about 1,000 daltons to about 8,000 daltons.

8. The method of claim 1, wherein the surfactant comprises nonylphenol ethoxylat.

9. The method of claim 1, wherein the surfactant has a Hydrophilic-Lipophilic Balance of about 12 to about 14.

10. The method of claim 9, wherein the liquid phenol-formaldehyde resole resin has a weight average molecular weight of about 1,000 daltons to about 8,000 daltons and a formaldehyde to phenol molar ratio ranging from about 2:1 to 2.65:1.

11. The method of claim 1, wherein the spray-dried resin has a packed bulk density ranging from about 0.15 g/cm³ to about 0.85 g/cm³.

12. The method of claim 1, wherein the presence of the surfactant reduces a packed bulk density of the spray-dried resin by about 2% or more, as compared to an identical aerated liquid phenol-formaldehyde resole resin spray-dried without the surfactant.

13. The method of claim 1, wherein the aerated liquid phenol-formaldehyde resole resin has a gas volume fraction ranging from about 1% to about 20%.

14. The method of claim 1, further comprising:
combining the spray-dried resin with a plurality of particulates to form a curable mixture; and
at least partially curing the curable mixture to produce a product.

15. The method of claim 1, wherein the surfactant comprises (1,1,3,3-tetramethylbutyl)phenyl-polyethylene glycol.

16. The method of claim 1, wherein the aerated liquid phenol-formaldehyde resole resin contains from about 0.1 wt % to about 0.3 wt % of the surfactant, based on the combined weight of the liquid phenol-formaldehyde resole resin and the surfactant.

17. A method for producing a phenol-formaldehyde resole resin powder, comprising:
synthesizing a liquid phenol-formaldehyde resole resin;
combining a surfactant with the liquid phenol-formaldehyde resole resin in an amount sufficient to produce a mixture containing about 0.02 wt % to about 2.5 wt % of the surfactant, based on a combined weight of the liquid phenol-formaldehyde resole resin and the surfactant, wherein the surfactant is nonionic, and wherein the surfactant comprises an alkyl phenol ethoxylate, (1,1,3,3-tetramethylbutyl)phenyl-polyethylene glycol, or any mixture thereof;
agitating the mixture to produce an aerated mixture; and
spray-drying the aerated mixture to produce a spray-dried phenol-formaldehyde resole resin powder.

18. The method of claim 17, wherein the mixture contains from about 0.02 wt % to about 0.3 wt % of the surfactant, based on the combined weight of the liquid resole resin and the surfactant.

19. The method of claim 17, wherein the mixture is sufficiently agitated to produce an aerated mixture having a gas volume fraction of about 1% to about 20%.

20. The method of claim 19, wherein the aerated mixture is spray-dried before the aeration caused by the agitation has dissipated such that the gas volume fraction decreases below about 1%.

21. The method of claim 17, wherein the surfactant comprises nonylphenol ethoxylate.

22. The method of claim 17, wherein the surfactant comprises (1,1,3,3-tetramethylbutyl)phenyl-polyethylene glycol.

23. A method for producing a phenol-formaldehyde resole resin powder, comprising:
spray-drying an aerated aqueous phenol-formaldehyde resole resin containing from about 0.02 wt % to about 2 wt % of a surfactant, based on a combined weight of the aqueous phenol-formaldehyde resole resin and the surfactant to produce a spray-dried phenol-formaldehyde resole resin powder, wherein:
the liquid phenol-formaldehyde resole resin has a formaldehyde to phenol molar ratio ranging from about 2:1 to about 2.65:1 and a weight average molecular weight of about 1,000 daltons to about 8,000 daltons,
the surfactant is nonionic,
wherein the surfactant comprises an alkyl phenol ethoxylate, (1,1,3,3-tetramethylbutyl)phenyl-polyethylene glycol, or any mixture thereof,
the aerated aqueous phenol-formaldehyde resole resin has a gas volume fraction of about 1% to about 20%,
the spray-dried resin has a packed bulk density ranging from about 0.15 g/cm$^3$ to about 0.85 g/cm$^3$, and
the presence of the surfactant reduces the packed bulk density of the spray-dried resin by at least 2%, as compared to an identical liquid phenol-formaldehyde resin spray-dried without the surfactant.

24. The method of claim 23, wherein the surfactant comprises nonylphenol ethoxylate, (1,1,3,3-tetramethylbutyl)phenyl-polyethylene glycol, or a mixture thereof.

* * * * *